July 24, 1956  R. J. SAMANIE  2,755,501
SHRIMP SEPARATING AND PEELING MACHINES
Filed Dec. 4, 1952  5 Sheets-Sheet 1
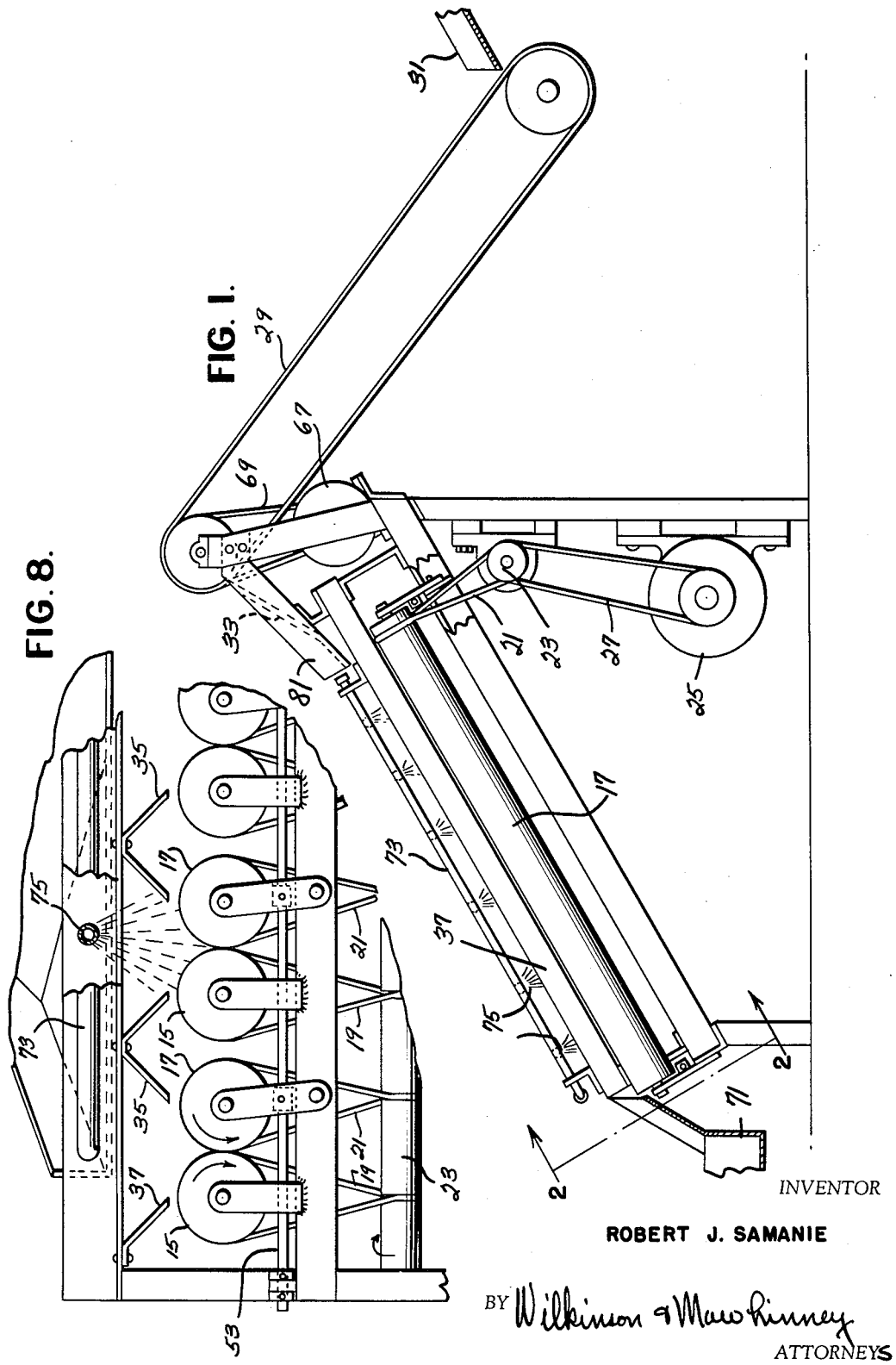
INVENTOR
ROBERT J. SAMANIE
BY *Wilkinson & MacKinney*
ATTORNEYS

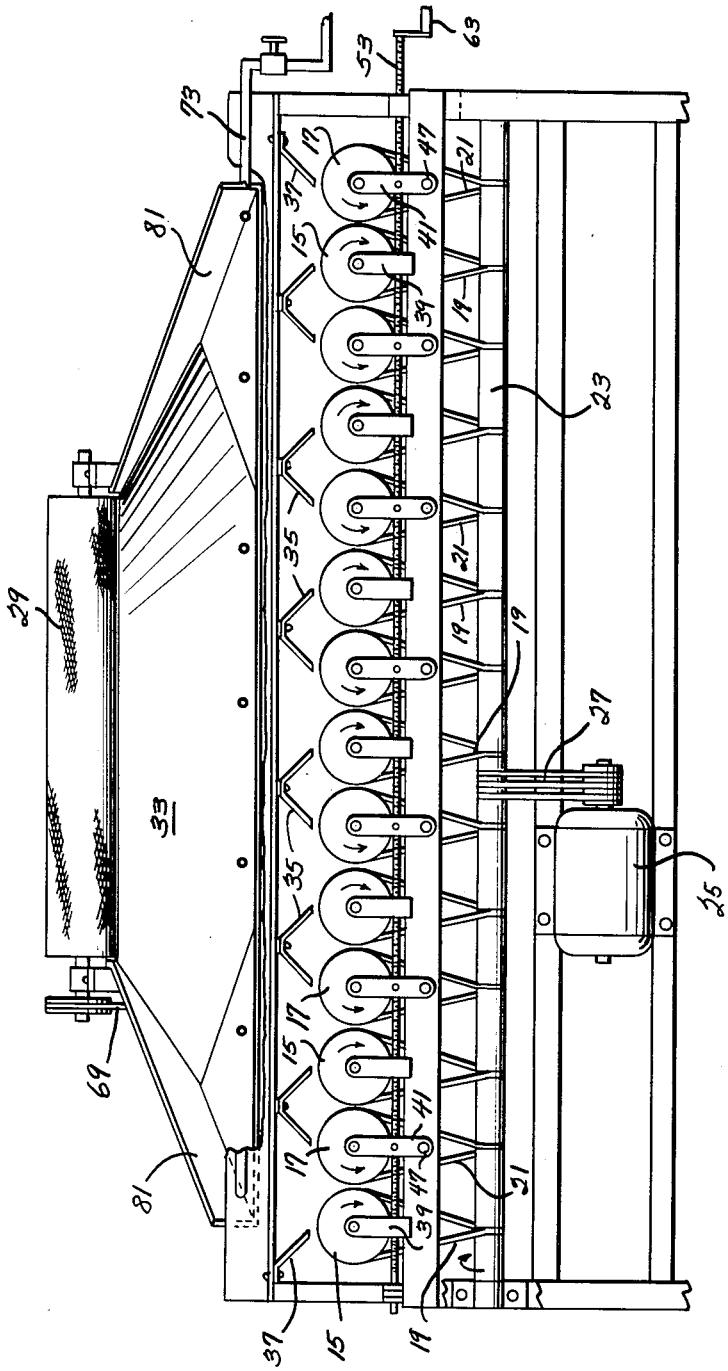

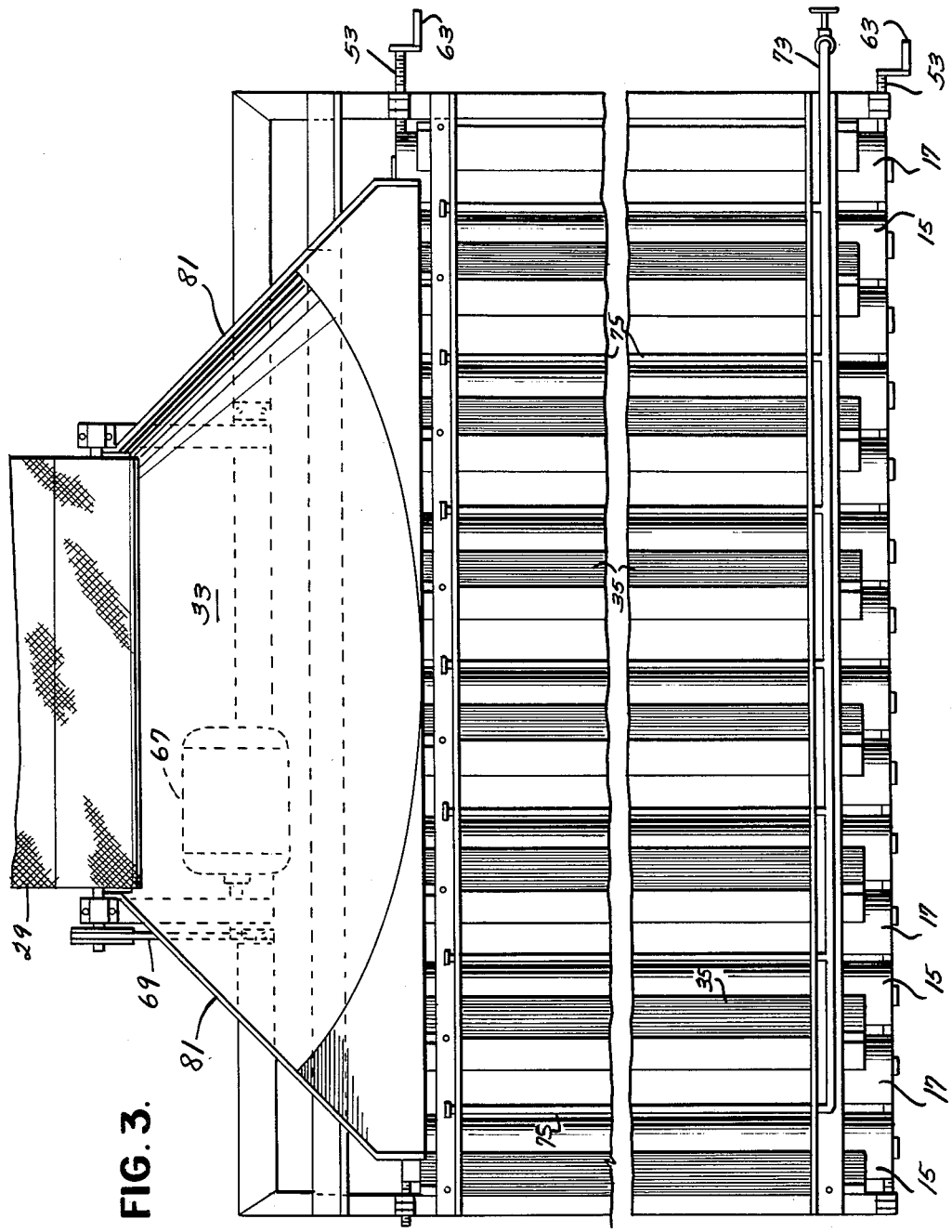

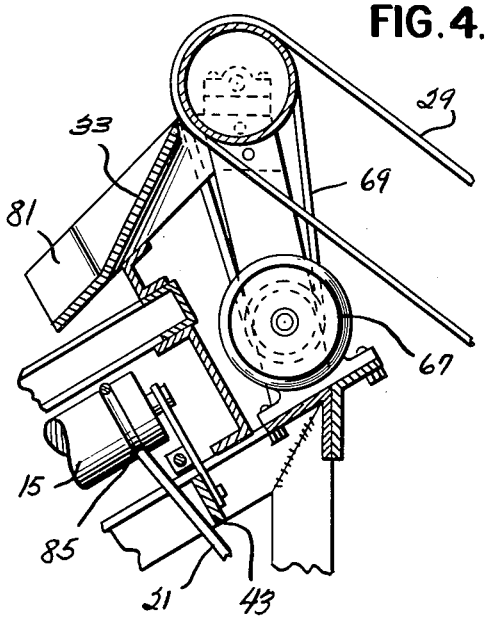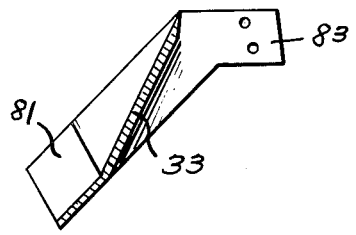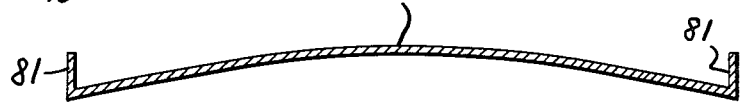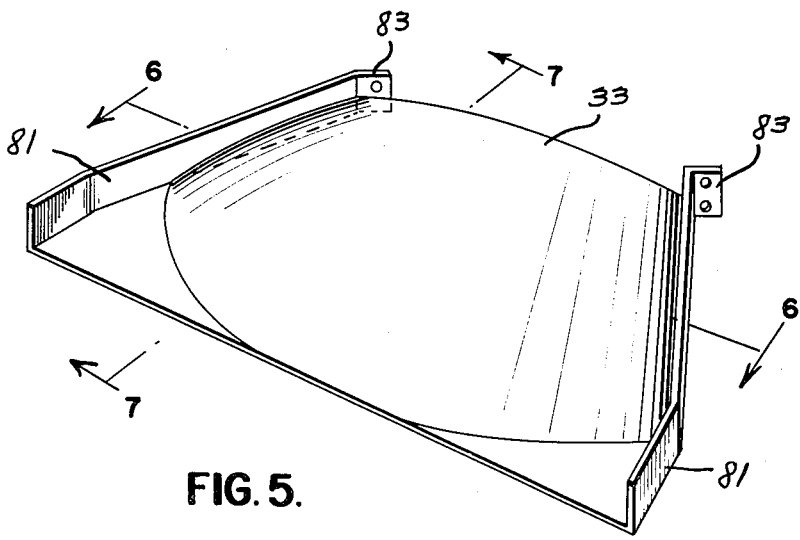

July 24, 1956   R. J. SAMANIE   2,755,501
SHRIMP SEPARATING AND PEELING MACHINES
Filed Dec. 4, 1952   5 Sheets-Sheet 5

INVENTOR
ROBERT J. SAMANIE
BY Wilkinson & MacKinney
ATTORNEYS

United States Patent Office 2,755,501
Patented July 24, 1956

2,755,501

SHRIMP SEPARATING AND PEELING MACHINES

Robert J. Samanie, Houma, La.

Application December 4, 1952, Serial No. 323,988

16 Claims. (Cl. 17—2)

The present invention relates to improvements in shrimp separating and peeling machines and has for an object to provide a machine for the cleaning and processing of shrimp, the primary purpose of which is the separation of hulls and other debris from peeled meats after the same have been subjected to the action of a shrimp cleaning machine, for instance, of the type disclosed in the Lapeyre et al. Patents No. 2,537,355, granted January 9, 1951 and No. 2,574,044 granted November 6, 1951.

Another object of the invention is to provide a machine for separating the trash from the peeled meats which is convertible into a shrimp peeling machine by simple adjustment to thereby alter the machine so that the same may be useful for the removal of the hulls from the shrimp.

A further object of the invention is to provide, as a unit, in a shrimp separating and peeling machine, an association of two rollers in which one of the rollers at least is mounted for bodily movement toward and from the companion roller of the unit to vary the nip or crotch between the rollers to enable the machine to act as a separating device or as a peeling device and for the purpose of adjustment of the gap between the rollers as required by large and small shrimp.

The invention also contemplates a machine for separating and peeling shrimp which is composed of a plurality of units of the character above indicated in which all bodily movable rollers are connected for simultaneous adjustment to a common operating means which may be conveniently operated from one side of the machine.

The invention further contemplates the use of a novel form of feeding slide on which the shrimp to be processed are initially delivered and which acts to distribute the shrimp substantially uniformly to a plurality of channels composed of the unitary rollers above described whereby to maintain all channels constantly and substantially uniformly supplied with the shrimp, to the end of increasing the capacity of the machine.

A still further object of the invention is to provide for a structurally and operationally simple form of drive for imparting rotary movement to the rollers with the component rollers of each unit rotating in relatively opposite directions with the adjacent nip surfaces of the rollers both travelling downwardly.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevational view with parts broken away and parts shown in section, of a shrimp separating and peeling machine constructed in accordance with the present invention.

Figure 2 is a front elevational view of the same with parts broken away.

Figure 3 is a top plan view of the machine.

Figure 4 is a vertical sectional view taken on an enlarged scale of the detail showing the drive mechanism for the feeding conveyor and for the separating and peeling rollers.

Figure 5 is a perspective view of a preferred form of curved feeding slide.

Figure 6 is a transverse sectional view taken on the line 6—6 of Figure 5.

Figure 7 is a longitudinal sectional view taken on the line 7—7 of Figure 5.

Figure 8 is an enlarged fragmentary front elevational view of the machine with parts broken away.

Figure 9:
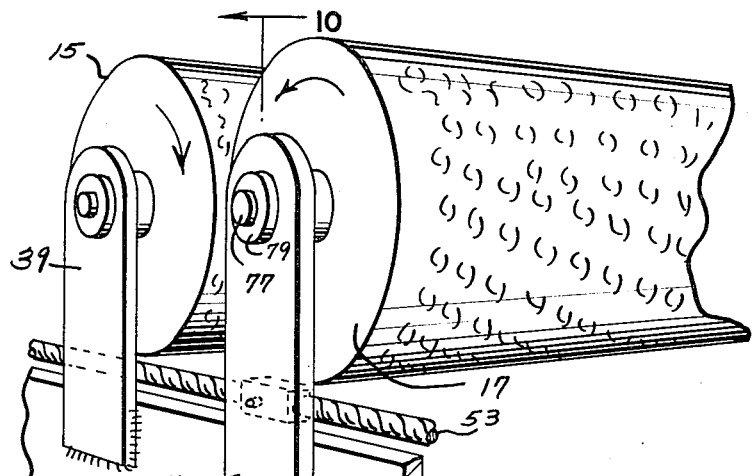
Figure 9 is a fragmentary perspective view showing a portion of the framework and of the unitary rollers with a portion of the mechanism for bodily adjusting one roller toward and from its companion roller.
Figure 11:
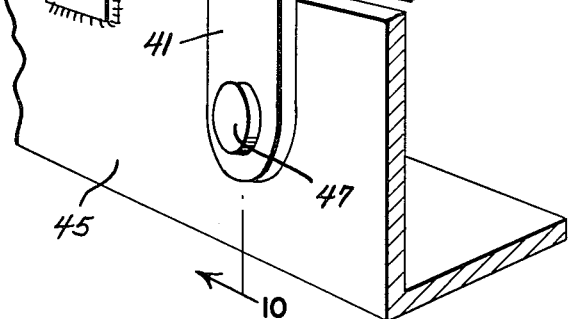
Figure 11 is a perspective view, partly broken away showing the double or duplex form of channel guard.
Figure 12:
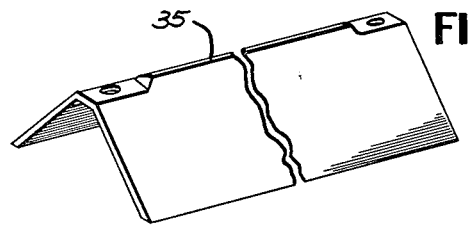
Figure 12 is a similar view of a form of single end guard.
Figure 13:
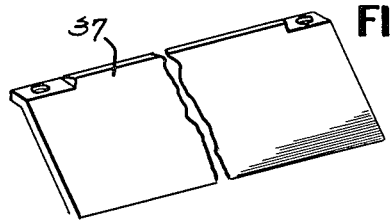
Figure 13 is a fragmentary perspective view of a portion of the frame showing the screw adjusting shaft and its adjustable mounting.
Figure 14:
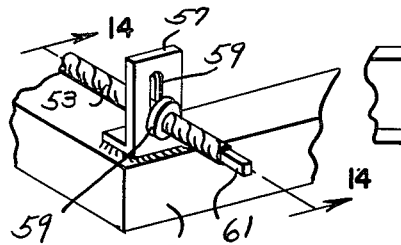
Figure 14 is an enlarged vertical sectional view taken on the line 14—14 of Figure 13.

Referring more particularly to the drawings, the machine may be composed of one or a multiplicity of roller units composed of two rollers each designated 15, 17. Such rollers are preferably all mounted in the same plane and preferably longitudinally inclined, and all of the rollers are powered to rotate by any suitable means. For instance, power may be supplied to the rollers by means of V-belts or other belts 19, 21 which transmit power from a belt drive shaft 23 driven by an electric or other motor 25 from drive belts 27. The belts are reversely twisted so that the left hand roller 15, which may be the fixed roller, rotates in a clockwise direction as viewed from the lower end of the machine (see Figures 2, 8 and 9), whereas the right hand roller 17, which is the adjustable roller, rotates in a counterclockwise direction.

Shrimp are introduced into the machine by means of a wire net or other conveyor belt 29 drawing shrimp from a supply flume 31 and depositing the shrimp onto a convex feeding slide or apron 33 employed to distribute the shrimp substantially evenly over the entire width of the machine. Double or duplex intermediate channel guards 35 are mounted over the rollers in such positions as to insure that shrimp falling into the machine from the convex feeding slide 33 are channeled into the crotches or channels formed between the member rollers 15, 17 of each roller unit. Single end channel guards 37 for the same purpose are mounted over the rollers 15, 17 extending at the extreme sides of the machine.

Fixed supports 39 are provided for the rollers 15 and movable supports 41 for the rollers 17. The supports are carried by upper and lower transverse beams 43, 45. The fixed supports 39 may be welded or otherwise affixed to the beams while the movable supports 41 are pivoted to the beams as indicated at 47. The rollers 15, 17 are appropriately journaled to rotate in the supports 39, 41.

Swivel nut blocks 49 are carried by the swinging or movable supports 41, the blocks or nuts 49 being pivotally attached to the supports 41, as by pins 51. The nuts 49 have threaded openings therethrough which are engaged by screw adjusting rods 53. One screw adjusting rod is provided in conjunction with each beam 43, 45. The screw rods 53 extend in common to all of the nuts 49 employed at each end of the machine.

The screw rods 53, at or near their ends, are provided with spaced fixed collars 55 on opposite sides of guide brackets 57 providing cooperating abutting parts carried by the frame 65 for rigidly preserving the adjustment of the width of the space between the rollers. The ends of the screw rods 53 extend through these brackets 57 which are provided with elongated slots substantially vertically disposed to permit the slight vertical movement of the rods 53 that might be required incident to the rotary movement of the supports 41. The collars 55 permit free rotary movement of the rods 53 but restrain such rods from any longitudinally or axially sliding movement. Therefore, when the rods 53 are rotated, the nuts 49 will progress in one direction or the other relatively along said rods 53 dependent on the direction of rotary adjusting movement of the rods 53. At their extreme exposed ends 61, the rods are squared or formed into other non-circular cross-section to receive cranks 63 or other devices by which the rods 53 may be conveniently rotated.

This wire net conveyor belt 29 may be driven from an electric or other motor 67 through a drive belt 69.

In the operation of the machine, when utilized as a separating device, rather than as a peeling machine, the adjustable roller 17 in each roller unit is brought to a maximum distance from the fixed roller 15 of such unit without allowing sufficient space for shrimp meats to pass between the rollers. The hulls and other debris are caught in the bight or nip of the rollers and pass between the same. Such separated material may drop by gravity into a suitable pan or receptacle under the rollers. Also such separated material may be propelled by centrifugal force from the rollers. The shrimp meats, being less compressible and more slippery than the trash, are not caught in the bight of the rollers but travel down the length of the rollers to a trough 71 at the lowermost end of the machine. Water lines 73 with sprays 75 at appropriate intervals are placed above the rollers substantially parallel to the working crotch or nip of the rollers in each unit. The space between the rollers in each unit is governed by the relative size of the shrimp introduced into the machine and this space is adjusted by the use of the screw rods 53.

The rollers 15, 17 have relatively hard surfaces and may be fabricated of any suitable material, for instance, stainless steel. The surfaces of the rollers may be roughened (Figure 9) to promote a greater degree of "grab" onto hulls and other debris. Preferably the rollers are relatively small in size. That is, they are small enough not to cause mutilation of meats. A satisfactory machine utilizes rollers of approximately one inch in diameter. However, such rollers could be considerably larger and yet not cause mutilation and could be even smaller while retaining a large degree of effectiveness.

The water sprays 75 serve to clean and lubricate the rollers and, by the force of the spray, assist to drive the trash or debris, or some of the same, through the openings between the rollers. The water sprays may also assist to move a peeled meat down the inclined troughs formed between adjacent rollers 15, 17.

By adjusting the rollers 15, 17 to a very small clearance, or by adjusting the rollers so that they actually form contact, peeling action is obtained.

When used as a separator the rollers would be powered to rotate at a relatively high speed. For the peeling operation, the speed of the rollers may be somewhat reduced.

Figure 10:
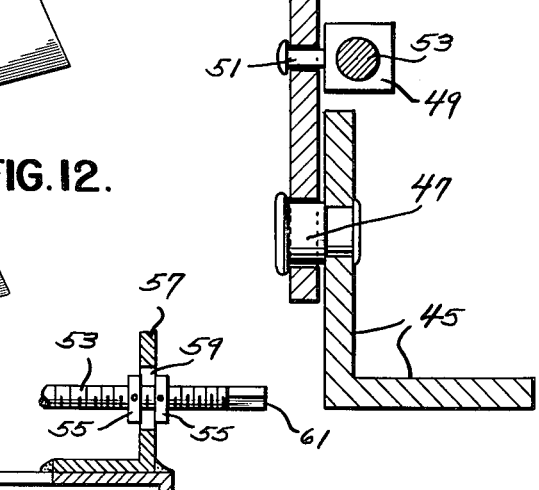
Figure 10 is a vertical sectional view taken on the line 10—10 of Figure 9.

Referring more particularly to Figures 9 and 10, 77 represents the journals of the rollers and 79, bronze bushings fixedly carried by the supports 39, 41 in which the journals 77 rotate.

It will be noted from Figure 10 that the pivots 47 are loosely mounted in the movable supports 41. The pivots 47 are preferably stationary with the beams 43, 45.

Referring more particularly to Figures 4–7, the sides of the convex feeding slide 33 are preferably provided with upstanding flanges 81, the upper ends 83 of which are perforated to receive fastenings by which the same are affixed to an appropriate part of the framework.

In Figure 4, the belt 21 is shown as running in annular grooves 85 in the upper portions of the rollers.

Although I have disclosed herein the best form of the invention known to me at this time, I reserve the right to all such modifications and changes as may come within the scope of the following claims.

What I claim is:

1. A separating and peeling machine for shrimp or the like comprising a unit of two parallel axially inclined spaced-apart continuously rotating rollers, means operatively associated with said rollers to rotate the rollers continuously in opposite directions with their adjacent nip portions moving together and downwardly, and means positioned above said rollers to supply water to the rollers.

2. A separating and peeling machine for shrimp or the like comprising a unit of two parallel axially inclined spaced-apart continuously rotating rollers, means operatively associated with said rollers to continuously rotate the rollers in opposite directions with their adjacent nip portions moving together and downwardly, and a water line positioned above said rollers extending longitudinally of the rollers having outlets for directing sprays of water downwardly upon the rollers and upon the spaces between the rollers with sufficient force to drive the trash and debris through the openings between the rollers.

3. A separating and peeling machine for shrimp or the like comprising a support, a unit of two parallel axially inclined spaced-apart rollers on said support, means operatively associated with said rollers to continuously rotate the rollers in opposite directions with their adjacent nip portions moving together and downwardly, and means operatively associated with the support and rollers to adjust the space between the rollers and to maintain rigidly the adjusted space between the rollers.

4. A separating and peeling machine for shrimp and the like comprising a support, a unit of two substantially parallel rotary rollers mounted on said support with their axes inclined, means operatively associated with said rollers to rotate the rollers in relatively opposite directions, means operatively associated with said rollers and support for mounting at least one of the rollers for bodily movement toward and from the companion roller to provide an adjustable spacing between the rollers, said last-named means rigidly maintaining the adjustment until a further positive adjusting operation.

5. A separating and peeling machine for shrimp and the like comprising a support, a unit of two spaced apart rotary rollers disposed side by side on said support to provide a channel and nip therebetween, a movable mounting for one of the rollers to permit of bodily movement of such roller toward and from the companion roller to vary the width of the nip, a swivel nut carried by the mounting, and an adjusting screw threaded through the nut and mounted for rotary movement but restrained from axial motion.

6. A separating and peeling machine for shrimp and the like as claimed in claim 5 further comprising slotted brackets on said support through which the screw is entered and collars fixed to the screw at opposite sides of the brackets.

7. A separating and peeling machine comprising a support, a plurality of units of rollers on said support each comprising two spaced apart rollers oppositely rotated and adjacently disposed to provide a channel and nip therebetween, movable mountings for one of the rollers of each unit operatively associated with said support, swivel nuts on the mountings, a screw rod mounted threadedly in common through all the nuts, end bearings for the screw rod, means between said bearings and support cooperating with the bearings to prevent axial motion of the rod while allowing free rotation thereof, and means to rotate the rod.

8. In a separating and peeling machine for shrimp and the like, a plurality of pairs of separating and peeling members, the members of each pair defining a channel therebetween, and a convex feeding slide for receiving the shrimp and distributing the same substantially uniformly to the several channels.

9. In a separating and peeling machine for shrimp comprising an inclined support, a unit of two rollers carried on said support in parallel spaced adjacent relationship, drive means for rotating said rollers in opposite directions with their adjacent nip portions moving together and downwardly, said rollers defining a channel above their nip portions over which the shrimp slide, and means operatively associated with said rollers and support for providing and rigidly maintaining a predetermined space between the nip portions of said rollers to permit trash separated from said shrimp to pass therebetween and to permit the shrimp meat to be moved over said rollers to the foot of the inclined support.

10. A shrimp separating and peeling machine comprising an inclined support, a unit of two rollers carried on said support in parallel spaced adjacent relationship, drive means for rotating said rollers in opposite directions with their adjacent nip portions moving together and downwardly, said rollers defining a channel above their nip portions over which the shrimp are propelled, means operatively associated with said rollers and support for varying the space between said rollers to permit trash separated from said shrimp to pass therebetween, and means positioned above said rollers for supplying water to the rollers for washing trash removed from said shrimp through the said space between the rollers and for lubricating the surface of the channel of the rollers over which the shrimp slide.

11. In a separating and peeling machine for shrimp comprising a unit of two rollers, support means operatively associated with said rollers for maintaining said rollers in axially inclined spaced-apart relationship, said rollers being disposed in adjacent relationship to define a channel above their nip portions over which the shrimp slide, means for rotating said rollers in opposite directions with their adjacent nip portions moving together and downwardly, and water spray means positioned above said rollers and being directed into the channel above said nip portions to lubricate the rollers and facilitate movement of the shrimp thereover.

12. A separating and peeling machine for shrimp and the like comprising a support, a unit of two rollers arranged on said support side by side to provide a channel and nip therebetween, drive means operative associated with said rollers to rotate the rollers in relatively opposite directions, means to mount at least one of the rollers above said support for bodily movement relatively to the companion roller to vary the width of the space between the rollers, and means operatively associated with said movable roller to bodily move the bodily movable roller, said last-named means having cooperating abutting parts operatively associated with said support for rigidly preserving the adjustment of the width of the space between the rollers until positive application of power to said last-named means to effect a subsequent adjusting movement.

13. A separating and peeling machine for shrimp or the like comprising a unit of two parallel axially inclined spaced-apart rollers, means operatively associated with one of said rollers to rotate it continuously in one direction, means operatively associated with the other of said rollers to rotate it continuously in a direction opposite to that of the said one roller, said rotating means causing the adjacent nip portions of the rollers to move simultaneously downwardly, and means positioned above said rollers to supply water to the rollers.

14. A separating and peeling machine for shrimp or the like comprising a unit of two parallel axially inclined spaced-apart rollers, means operatively associated with one of said rollers to rotate it continuously in one direction, means operatively associated with the other of said rollers to rotate it continuously in a direction opposite to that of the said one roller, means for varying the space between said rollers for selectively effecting separator and peeling action on the shrimp.

15. A separating and peeling machine for shrimp or the like comprising a unit of two parallel axially inclined spaced-apart rollers, means operatively associated with one of said rollers to rotate it continuously in one direction, means operatively associated with the other of said rollers to rotate it continuously in a direction opposite to that of the said one roller, means for varying the space between said rollers for selectively effecting separator and peeling action on the shrimp, and means for varying the speed of both said roller rotating means.

16. A separating and peeling machine for shrimp or the like comprising a unit of two parallel axially inclined spaced-apart rollers, means operatively associated with one of said rollers to rotate it continuously in one direction, and means operatively associated with the other of said rollers to rotate it continuously in a direction opposite to that of the said one roller, said rotating means causing the adjacent nip portions of the rollers to move simultaneously downwardly.

References Cited in the file of this patent

UNITED STATES PATENTS

| | | |
|---|---|---|
| 422,908 | Brewster | Mar. 11, 1890 |
| 571,266 | Favrow | Nov. 10, 1896 |
| 622,287 | Stephenson | Apr. 4, 1899 |
| 1,082,544 | Matheus | Dec. 30, 1913 |
| 2,482,633 | Nichols | Sept. 20, 1949 |
| 2,537,355 | Lapeyre et al. | Jan. 9, 1951 |
| 2,574,044 | Lapeyre et al. | Nov. 6, 1951 |